May 7, 1968  D. F. WILBER  3,381,385
UNIVERSAL JOINT GAUGE
Filed May 5, 1966

INVENTOR.
DONALD F. WILBER
BY Strauch, Nolan, Neale,
Nies & Bronaugh
ATTORNEYS

# United States Patent Office 3,381,385
Patented May 7, 1968

3,381,385
UNIVERSAL JOINT GAUGE
Donald F. Wilber, Allegan, Mich., assignor to North American Rockwell Corporation, a corporation of Delaware
Filed May 5, 1966, Ser. No. 547,899
1 Claim. (Cl. 33—174)

ABSTRACT OF THE DISCLOSURE

A gauge to measure and check various vital dimensions on the center cross and yoke of a universal joint to identify the coded size of the joint for installation of correct replacement parts.

---

The gauge consists of an elongated flat member having precisely spaced abutments and marks along its edges and a number of circular apertures along its length, all of which are distinguishably correlated with each other so that upon measuring of two related dimensions the correct code number of the joint can be determined.

This invention relates to a universal joint gauge and particularly to a gauge of this type having structural components in novel association for ready identification of the joint from gauging one part thereof.

Large manufacturers of universal joints for vehicle drive lines such as propellor shafts make a considerable number of joints of different sizes and other characteristics for different vehicles and applications. These different joints are usually identified by a code number, and once the code number is known all dimensions and related parts can be ascertained from a company catalogue.

In replacing or repairing these joints, in whole or in part, it is important to supply the same size joint or parts. This is not always an obvious matter because two joints of almost the same size may look alike, or their components may be so damaged, missing or in such condition that the code number is not visible.

The major object of the present invention is to provide a universal joint gauge of novel construction which enables an operator to readily identify the joint by a simple measurement of one of the major components of the joint.

A further object of the invention is to provide a universal joint identification gauge which comprises correlated metering areas for measuring different yoke or cross member dimensions arranged and combined in novel relation.

A more specific object of the invention is to provide a novel universal joint identification gauge having correlated cross member length and trunnion diameter areas, and yoke arm spacing areas, all arranged in compact relation on a single structurally novel marked plate.

Further objects of the invention will appear as the description proceeds in connection with the appended claim and the annexed drawings wherein:

Figure 1:
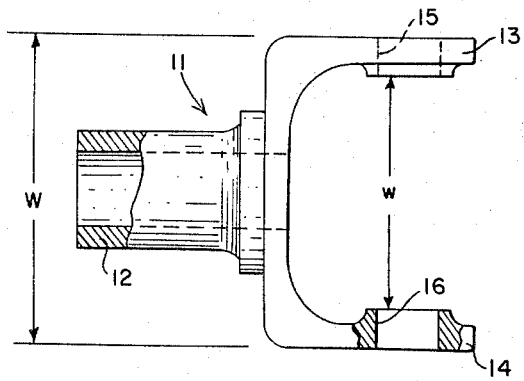
FIGURE 1 is a side elevation partly in section showing a universal joint yoke of the type for which the gauge of the invention is adapted.
Figure 2:
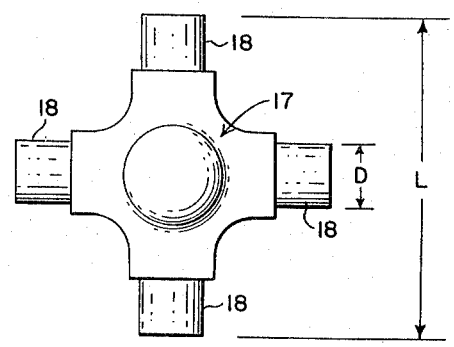
FIGURE 2 is an elevation showing a cross member for attachment to the universal joint yoke of FIGURE 1.

FIGURE 1 shows a universal joint yoke 11 comprising a hollow hub 12 and spaced parallel arms 13 and 14. These arms are formed with identical aligned circular openings 15 and 16. FIGURE 2 shows a joint cross member 17 which has four 90° apart cylindrical trunnions 18. In the universal joint assembly two opposed trunnions 18 extend through yoke openings 15 and 16, and an annulus of needle bearings is interposed between the cylindrical surfaces of each trunnion 18 and its surrounding yoke arm opening. A yoke similar to yoke 11 at least as far as arms 13 and 14 are concerned is similarly attached to the other opposed pair of trunnions 18.

Figure 3:
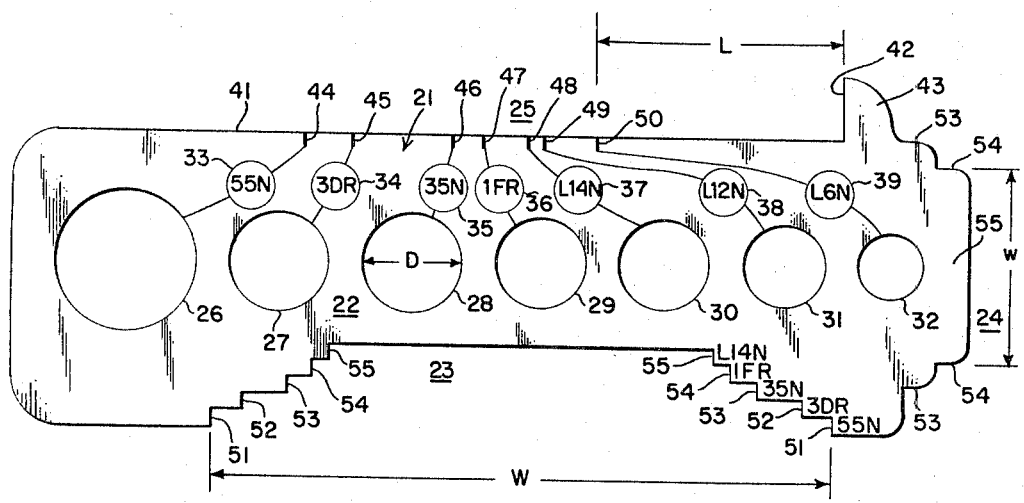
FIGURE 3 is a plan view showing the gauge of the invention.

FIGURE 3 illustrates the gauge of the invention. This is preferably a relatively stiff plate or sheet 21 of plastic or metal having a novel association of structural formations and index markings that relate to identification of the universal joint parts.

Gauge plate 21 has four dimension measuring and part identification areas 22, 23, 24 and 25.

Identification area 22 consists of a series of circular openings 26–32 of different size. These openings are dimensioned to fit over the trunnions 18 of the joint cross member, and associated with these openings are a series of printed or marked legends 33–39 that identify the particular universal joint in a code indication used by the manufacturer to designate his part. For example, if the trunnion of a yoke in question fits into the opening 28, the user then knows that this is a joint of the type 35N shown in the legend at 35 which is connected to opening 28 by a line on the surface of the plate 21. This trunnion diameter is shown at D in FIGURE 2.

The gauge plate at area 21 is formed along one longitudinal side with a straight edge 41 which intersects at right angles a straight edge 42 on an integral lateral projection 43 near one end of the plate. Edge 41 bears in spaced relation to edge 42 a series of index marks 44–50 which are connected by surface lines on the plate to the legends 33–39 respectively. The respective distances from edge 42 to the marks 44–50 represent the so-called cross member lengths of the different sized universal joints, this cross length being the dimension shown at L in FIGURE 2 and representing the distance between each pair of opposite trunnion ends. Thus if the gauge is applied with edge 42 flush with one flat end of a trunnion of cross member 17 the diametrically opposite flat trunnion end will align with one of the index marks 44–50 and thus identify the particular joint by reference to the legend associated with it.

Gauge areas 23 and 24 apply to the yokes of FIGURE 1. Area 23 comprises a successively stepped side recess exhibiting opposed pairs of parallel faces 51–55 having different spacing each marked on the plate surface with a legend (L14N, 1FR, etc.) corresponding to legends in the group 33–39. Referring to FIGURE 1 it will be seen that the yoke outer width dimension is indicated at W. If for example gauge 21 is applied to a yoke and the surfaces 52—52 embrace the yoke outer width, this identifies the yoke as Type 3DR.

Gauge area 24 comprises a successively stepped longitudinal projection 55 preferably located at the edge of plate 21 where lateral projection 43 is disposed, and it exhibits spaced parallel pairs of faces 53 and 54, marked with legends corresponding to others of the group 33–39. When projection 55 is thrust between yoke arms 13 and 14, whichever one of the pairs of faces 53 or 54 snugly fits between the inner sides of the arms, the inner width distance W in FIGURE 1, identifies the universal joint being measured.

In some modifications all of the different sized yoke outer widths may be included in area 23, and all of the different yoke inner widths may be included in area 24, or they may be differently distributed between the areas from the arrangement shown in the preferred embodiment of FIGURE 3, which latter provides an optimum compact easy to use gauge structure.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by Letters Patent is:

1. A gauge particularly adapted to identify dimensions on a universal joint cross and yoke member with said cross having opposed cylindrical trunnions and said yoke having spaced parallel arms, comprising in combination a substantially rectangular elongated flat plate having along one of its longer sides a successively stepped recess, said steps defining spaces of consecutively narrowing widths and whose side edge are parallel to the shorter sides of said plate and whose bottom surfaces are parallel to the longer sides of said plate; a successively stepped projection extending from one of the shorter sides of said plate, the steps of said projection defining areas of consecutively narrowing widths; a lateral projection adjacent said one shorter side providing an abutting face for said stepped projection and having a side surface forming a right angle with said other longer side, said stepped recess and said stepped projection having predetermined fixed narrowing width relationships corresponding to the width dimensions between outer and inner faces of the yoke arms; positions marked at the edge of said other long side at predetermined distances from said side surface of said lateral projection but irregularly spaced in relation to each other; a plurality of circular apertures extending through and spaced along the length of said plate having varying diameters corresponding to a predetermined fixed relationship between said apertures and said marked positions at the edge of said other side, and indicia on said flat plate identifying related steps of said stepped recess and stepped projection and also identifying related apertures and marked positions.

No references cited.

SAMUEL S. MATTHEWS, *Primary Examiner.*

UNITED STATES PATENT OFFICE
CERTIFICATE OF CORRECTION

Patent No. 3,381,385                                  May 7, 1968

Donald F. Wilber

It is hereby certified that error appears in the above numbered patent requiring correction and that the said Letters Patent should read as corrected below.

Column 3, line 16, "edge" should read -- edges --. Column 4, line 18, cancel "No references cited." and insert the following:

References Cited
UNITED STATES PATENTS

| | | | |
|---|---|---|---|
| 367,365 | 8/1887 | Clifford | 33-168A |
| 1,826,807 | 10/1931 | McDanel | 33-174A |
| 1,827,375 | 10/1931 | Schneider | 33-168A |
| 2,896,333 | 7/1959 | Kivela | 33-178A |
| 3,230,628 | 1/1966 | Hite | 33-174A |

Signed and sealed this 4th day of November 1969

(SEAL)
Attest:

EDWARD M. FLETCHER, JR.                        WILLIAM E. SCHUYLER, JR.
Attesting Officer                                   Commissioner of Patents